United States Patent [19]
Prantl et al.

[11] Patent Number: 5,073,623
[45] Date of Patent: Dec. 17, 1991

[54] CONDENSATION PRODUCTS BASED ON ROSIN

[75] Inventors: Bernhard Prantl, Worms; Rolf Walz, Rutesheim; Erwin Stark, Bad Boll, all of Fed. Rep. of Germany

[73] Assignee: BASF Lacke+Farben Aktiengesellschaft, Muenster, Fed. Rep. of Germany

[21] Appl. No.: 403,313

[22] Filed: Sep. 6, 1989

[30] Foreign Application Priority Data

Sep. 14, 1988 [DE] Fed. Rep. of Germany ....... 3831242

[51] Int. Cl.$^5$ ............................................. D06P 1/46
[52] U.S. Cl. ................................... 530/210; 530/214; 530/215; 530/226
[58] Field of Search ................. 530/210, 214, 215, 226

[56] References Cited

U.S. PATENT DOCUMENTS

| | | | |
|---|---|---|---|
| 2,532,120 | 11/1950 | Rummelsburg et al. | 530/210 |
| 2,720,513 | 10/1955 | Rummelsburg et al. | 530/210 |
| 2,720,514 | 10/1955 | Rummelsburg et al. | 530/210 |
| 4,342,631 | 1/1982 | Cuntze et al. | 530/210 |
| 4,643,848 | 2/1987 | Thomas et al. | 530/213 |

OTHER PUBLICATIONS

J 6 1264-014-A Derwert Abstract.
JA 711354R Derwert Abstract.

Primary Examiner—John Kight, III
Assistant Examiner—Dvc Truong
Attorney, Agent, or Firm—Keil & Weinkauf

[57] ABSTRACT

A rosin based condensation product produced by reacting in a multistage process the following reactants, rosin, phenolic compounds, formaldehyde, unsaturated $C_3$-$C_4$ dicarboxylic acid or maleic anhydride, monounsaturated or polyunsaturated aliphatic monohydric or dihydric alcohol or amine or a monounsaturated or polyunsaturated $C_2$-$C_{12}$ aminoalcohol or $C_2$-$C_{12}$ alkanediol or $C_2$-$C_{12}$ aminoalcohol, monounsaturated or polyunsaturated $C_8C_{40}$ fatty acid.

3 Claims, No Drawings

CONDENSATION PRODUCTS BASED ON ROSIN

The present invention relates to a condensation product based on rosin, obtainable by A) Reaction of
| | |
|---|---|
| 100 parts by weight of | rosin (component I) |
| 10–150 parts by weight of | an aromatic mono- or dihydroxy compound substituted by $C_1$–$C_{12}$-alkyl in the p-position (component II) and |
| 3–50 parts by weight of | formaldehyde or a formaldehyde donor compound (component III) | at 50°–250° C. in the presence of a base, although it is also possible first to prepare from components II and III a precondensate (resol) of an average degree of condensation of from 2 to 20, which is then reacted with component I, B) further reaction of the stage A condensation product
| | |
|---|---|
| (A) at 150–250° C. with | |
| 4–40 parts by weight of | an $\alpha,\beta$-unsaturated $C_3$- or $C_4$-mono- or dicarboxylic acid or with maleic anhydride (component IV) and |

$C_1$) reaction of the stage B adduct (B) at 100–200° C. with
| | |
|---|---|
| 3–100 parts by weight of | a monounsaturated or polyunsaturated aliphatic monohydric or dihydric alcohol or amine or a monounsaturated or polyunsaturated $C_2$–$C_{12}$-aminoalcohol (component V) | or $C_2$) reaction of (B) with
| | |
|---|---|
| 2–30 parts by weight of | a $C_2$–$C_4$-alkylene oxide or of a $C_2$–$C_{12}$-alkanediol or aminoalcohol (component VI) at 100–200° C. and then with |
| 10–100 parts by weight of | a monounsaturated or polyunsaturated $C_8$–$C_{40}$ fatty acid (component VII) at 150–250° C., | with the proviso that the molar amount of component (VII) is 0.2–1 mole per mole of (VI), or obtainable by D) reaction of
| | |
|---|---|
| 100 parts by weight of | rosin (I) with |
| 5–40 parts by weight of | component (IV) |
| at 150–250° C., | |

E) reaction of the stage D adduct (D) at 100–200° C. with
| | |
|---|---|
| 2–30 parts by weight of | a $C_2$–$C_{12}$-aminoalcohol (VIa), |

F) further reaction of the stage E product (E) at 50–250° C. with
| | |
|---|---|
| 10–150 parts by weight of | component II and |
| 3–50 parts by weight of | component III |
| in the presence of a base or with | |
| 10–200 parts by weight of | a component II/component III resol of an average degree of condensation of from 2 to 20 and |

G) reaction of the stage F condensation product (F) at
| | |
|---|---|
| 150–250° C. with | |
| 10–100 parts by weight of | component VII in the molar ratios of (VII):(VI) mentioned under ($C_2$). |

The present invention further relates to this condensation product, to the use thereof as a binder for print pastes, and to a print paste which contains this binder.

JP-A-075,771, JP-A-104,025 and U.S. Pat. No. 4,643,848 disclose condensation products of rosin, maleic anhydride and phenolic resins which are recommended for use as binders for printing inks.

Furthermore, the use of such condensation products for improving the alkali resistance of insulating materials is described in SU-A-670,599.

However, these resins have the disadvantages that they do not cure surriciently rapidly and that they do not show adequate wash fastness.

These disadvantages are particularly evident if such resins are used as binders in print pastes, in particular in intaglio print pastes.

This is because such print pastes must meet the following requirements:
  nontackiness, to prevent a printed sheet from sticking to the next sheet and make the use of an interleaf unnecessary;
  good alkali solubility, so that excess print paste may be rapidly and safely removed from the printing cylinder;
  good alkali resistance after curing and
  good solubility in mineral oils.

Since existing binders to not meet all these requirements, it is an object of the present invention to remedy all the defects mentioned.

We have found that this object is achieved by the condensation product defined at the beginning, the method of preparation thereof defined at the same time, the use thereof as a binder in print pastes, and a print paste which contains this binder.

The condensation product according to the invention is obtainable via stages A-$C_1$, an A-$C_2$ variant or, with the reaction steps in a different order, via stages D-G and will differ somewhat depending on its method of preparation.

The individual stages are subject to the following directions and recommendations:

STAGE A

The base material rosin (component I) consists essentially of four double-bond isomers which are in an equilibrium with one another and of which levopimaric acid

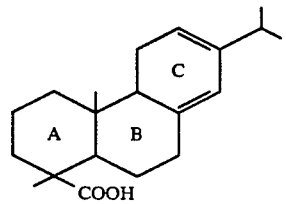

is feasible for the Diels-Alder and ene reaction with an $\alpha,\beta$-unsaturated acid of the type defined or maleic anhydride (component IV).

Component (II) will most likely be a p-alkylphenol, in which case $C_4-C_{10}$-alkyl is preferred as alkyl. Highly suitable compounds (II) are for example those in which alkyl is butyl, isobutyl, tert-butyl, hexyl, 2-ethylhexyl, octyl or nonyl.

Further compounds (II) are inter alia p-methyl-1-naphthol and also for example dihydroxy compounds such as 4,4'-dihydroxydiphenylmethane and 2,2-(4,4,-dihydroxydiphenyl)propane.

The amount of (II) is 10-150, preferably 20-100, parts by weight per 100 parts by weight of rosin (I).

The formaldehyde (component III) can take the form of an aqueous or organic solution or of a formaldehyde donor compound such as paraformaldehyde. The amount of formaldehyde is advantageously such that it corresponds to a degree of condensation of from 2 to 20 in the reaction with (II), ie. theoretically about 1.05-1.5 moles of III per mole of II. However, it is advisable in practice to use formaldehyde in excess of up to about 4 moles per mole of II.

The condensation reaction take place in the presence of a base, preferably a mineral base such as sodium hydroxide or magnesium oxide. It is also possible to use strong tertiary nitrogen bases such as triethylamine as condensation catalysts. The amount of base is in general from 2 to 30 mol % of the amount of component II.

It is possible to introduce molten rosin initially, to add components (II) and (III) and the base, and to react the mixture at 50°-150° C., preferably at 90°-120° C., until the desired degree of condensation is obtained. Excess formaldehyde is then separated off.

This is followed by heating to 150°-250° C., preferably 190°-230° C.

In another, somewhat more easily reproducible embodiment, first components (II) and (III) are combined at 50°-120° C. to prepare a resol, which is then reacted at 150°-250° C., preferably at 190°-230° C., with the rosin.

In either embodiment, it is possible to include a solvent, for example toluene or water, which is advantageously distilled off during or after the reaction.

To prevent the escape of volatile reactants, it is advisable to carry out the formation of resol at 90°-120° C. in a sealed vessel under autogenous pressure, for example up to 20 bar.

The resol is predominantly linked to the rosin at ring B or C.

The condensation product (A) is a solid, brownish mass with a softening point of about 90°-190° C.

STAGE B

The condensation product (A) can be reacted with an α,β-unsaturated $C_3$- or $C_4$-mono- or dicarboxylic acid (component IV) in the manner of a Diels-Alder reaction.

A suitable component (IV) is maleic acid, fumaric acid, acrylic acid or preferably maleic anhydride. The amount of (IV) corresponds to 4-40, preferably 6-30, parts by weight per 100 parts by weight of rosin.

The condensation product (A) can be introduced first and component (IV) second. The reaction is carried out at 150°-250° C., preferably at 180°-220° C., until component (IV) has been substantially converted. Advantageously, component (IV) is added at an elevated temperature which is approximately around the reaction temperature.

It is also possible to use a solvent, for example xylene.

Ordinarily, the reaction is carried out under atmospheric pressure, but can also be carried out within a sealed system at about 1-6 bar.

The adduct (B) is a solid, brownish mass with a softening point of 100°-200° C.

STAGE C ($C_1$) Component (V) can be any monounsaturated or polyunsaturated aliphatic monohydric or dihydric alcohol or amine having a chain length of from 3 to 20 carbon atoms. Particularly suitable compounds are oleyl alcohol, oleylamine and diallylamine among others. However, (V) can also be a monounsaturated or polyunsaturated $C_2-C_{12}$-aminoalcohol, for example 5-amino-2,5-dimethyl-3-hexen-2-ol. From 3 to 100 parts by weight of (V) are used per 100 parts by weight of rosin. The reaction can be carried out at 100°-200° C., preferably at 140°-180° C. To prevent premature curing it is advisable to employ oxygen-free conditions. For this reason it is advantageous to carry out the reaction under a nitrogen atmosphere.

($C_2$) Suitable components (VI) are $C_2-C_4$-alkylene oxides, $C_2-C_{12}$-alkanediols and $C_2-C_{12}$-aminoalcohols. Possible alkylene oxides are in particular ethylene oxide and propylene oxide. Highly suitable alkanediols are inter alia glycol, 1,3-propanediol and 1,4-butanediol.

A possible aminoalkanol is in particular 2-amino-1-ethanol, but it is also possible to use 2,2-aminoethoxyethanol, aminoethylethanolamine or 3-aminopropanol.

The amount of component (VI) is 2-30 parts by weight per 100 parts by weight of rosin. The reaction of component (VI) with (B) can be carried out at 100°-200° C., preferably at 130°-180° C. If an alkylene oxide is used, it is advisable to work under superatmospheric pressure of up to about 6 bar.

The reaction with component (VII) then follows, a suitable (VII) being a monounsaturated or polyunsaturated $C_8-C_{40}$ fatty acid, preferably oleic acid, ricinenic acid or linseed oil fatty acid. The molar amount of (VII) is preferably 0.2-1 mole per mole of (VI).

The reaction is carried out at 150-250C., preferably at 170°-210° C.

The condensation product according to the invention is obtained as a brownish mass with a softening point of 10°-130° C.

The condensation product according to the invention can also be obtained in a different sequence of the reaction steps, and the results are somewhat different.

STAGE D

Stage D comprises the reaction of rosin (I) with component (IV) in the manner of a Diels-Alder or ene reaction. Suitable components (IV) are α,β-unsaturated $C_3-C_4$-mono- or dicarboxylic acids, preferably maleic acid or maleic anhydride. The amount of (IV) is 5-40 parts by weight per 100 parts by weight of rosin.

The reaction can be carried out under the conditions described in stage (B).

The adduct (D) is a solid, brownish mass with a softening point of 80°-120° C.

STAGE E

The stage D adduct (D) is reacted with a component (VIa). A suitable (VIa) is a $C_2-C_{12}$-aminoalcohol, for example 6-amino-1-hexanol or 2-amino-1-ethanol, the latter being particularly suitable. (VIa) is used in an amount of 2-30 parts by weight per 100 parts by weight of rosin.

The reaction can be carried out under the conditions described in stage $C_2$ for aminoalcohols.

The amino group of component (VIa) reacts with the carboxyl groups of components (IV). If maleic acid or maleic anhydride is used, imides form particularly readily.

The condensation product (E) is a solid, brownish mass with a softening point of 50°-150° C.

STAGE F

As in stage (B), a resol formed from components (II) and (III) becomes bonded to the rosin structure of (E). Suitable components (II) and (III) are the compounds described in stage (A).

The amount of (II) is 50-150, preferably 20-100, parts by weight per 100 parts by weight of rosin. The amount of formaldehyde is chosen to be such that about 1.5-4.0 moles of (III) are used per mole of (II).

Condensation product (E) can be introduced first and components (II) and (III) second, or the resol is prepared first and then reacted with (E). Otherwise, the reaction can be carried out under the conditions described in stage (A).

The result obtained as condensation product (F) is a solid, brownish mass with a softening point of 40°-190° C.

STAGE G

Component (VII) is as described under ($C_2$) a monounsaturated or polyunsaturated $C_8$-$C_{40}$ fatty acid, preferably oleic acid or ricinenic acid.

The amount of (VII) is 10-100 parts by weight in the molar ratios of (VII):(VI) mentioned under ($C_2$).

The reaction can be carried out under the conditions described in ($C_2$).

The result obtained is the condensation product G according to the invention, which has a softening point of 10°-130° C.

The rosin-based condensation product according to the invention can be used as a binder for print pastes. It confers on the claimed print paste all the essential properties for use in intaglio printing.

To speed the autoxidation of the unsaturated radicals, the print paste may include appropriate catalysts (siccatives), in particular cobalt salts.

The print paste may additionally contain 0-30% by weight of an alkyd resin.

Alkyl resins are polyesters which are formed from polycarboxylic acids and polyalcohols, which are crosslinkable by atmospheric oxygen and which are modified with monocarboxylic acids. Examples of polycarboxylic acids which are frequently used are phthalic acid and isophthalic acid. Of the polyalcohols, glycerol is the most important. The modifying monocarboxylic acids come from natural oils, for example linseed oil (cf. Ullmanns Encyklopädie der Technischen Chemie, 3rd edition, volume 14, pages 99 et seq.).

The pigments used are the usual pigments suitable for print pastes on a mineral oil basis.

Suitable mineral oils are for example aliphatic and/or aromatic hydrocarbons and mixtures thereof, which preferably have a boiling range from 150° to 300° C.

It is also possible to add fillers and customary additives to the print paste.

A highly suitable print paste will for example have the following composition:

20-70% by weight of pigments and fillers
2-20% by weight of binders
0-30% by weight of alkyd resins and
a remainder of mineral oil and additives.

EXAMPLE 1

1336 g of rosin were melted under nitrogen and admixed at 100° C. with 270 g of butylphenol, 135 g of paraformaldehyde and 10 g of magnesium oxide. The reaction mixture was then refluxed at 110° C. for 4 hours, and the temperature was then raised to 200° C. in the course of hours, during which the volatile constituents were distilled off. Thereafter 235 g of maleic anhydride were added in the course of 30 minutes. The reaction mixture was heated at 200° C. for a further 2 hours, then cooled down to 180° C., admixed with 655 g of oleyl alcohol and heated at 180° C. for a further 8 hours.

The condensation product thus obtained had a softening point of 78° C.

EXAMPLE 2

1336 g of rosin were reacted by the method of Example 1 first with 270 g of butylphenol and 141 g of paraformaldehyde in the presence of 8 g of magnesium oxide and 150 g of butanol and then with 235 g of maleic anhydride. The reaction mixture was admixed at 160° C. with 145 g of ethanolamine, maintained at 160° C. for a further hour, then heated at 180° C. for 2 hours and then admixed with 638 g of ricinenic acid. The reaction mixture was water was distilled off. The condensation product obtained had a softening point of 60° C.

EXAMPLE 3

2004 g of rosin were admixed at 200° C. with 588 g of maleic anhydride in the course of 30 minutes and heated at 200° C. for a further 2 hours. The reaction mixture was then cooled down to 150° C. and mixed with 367 g of ethanolamine. The reaction mixture was heated at 150° C. for a further hour and then at 180° C. for 2 hours, during which volatile constituents were distilled off. 1125 g of the mixture thus obtained were admixed at 100° C. with 781 g of nonylphenol, 265 g of paraformaldehyde and 150 g of butanol and refluxed at 110° C. for 4 hours. The temperature was then raised to 180° C. for 5 hours, during which volatile constituents were distilled off. Thereafter 630 g of ricinenic acid were added, and the mixture was heated at 180° C. for a further 6 hours.

The condensation product thus obtained had a softening point of 70° C.

EXAMPLE 4

A print paste was prepared in a conventional manner from
  100 g the condensation product of Example 3
  100 g of the pigment Heliogen Blue D 7030
  250 g of precipitated chalk
  100 g of permanent white
  130 g of long-oil drying ricinenic/phthalic acid alkyd resin
  100 g of sodium dodecylbenzenesulfonate,
  20 g of cobalt octoate
  100 g of mineral oil of boiling range 160°-290° C. and
  100 g of montan wax and was used to intaglio print a paper of high wet strength. The printed sheets were not tacky, so that the use of interleaves was unnecessary. Excess ink was easily and completely removable from the printing cylinder with 0.5–1% strength alkali.

After curing, which took about 5–6 days, the needle-sharp prints proved to be highly alkali-resistant.

The same results are obtained with print pastes, which instead of condensation product 1 contain the condensation product of Example 2 or of Example 3.

We claim:

1. A condensation product based on rosin, obtainable by

| A) reaction of | |
| --- | --- |
| 100 parts by weight of | rosin (component I) |
| 10–150 parts by weight of | an aromatic mono- or dihydroxy compound substituted by $C_1$–$C_{12}$-alkyl in the p-position (component II) and |
| 3–50 parts by weight of | formaldehyde or a formaldehyde donor compound (component III) | at 50°–250° C. in the presence of a base, although it is also possible first to prepare from components II and III a precondensate (resol) of an average degree of condensation of from 2 to 20, which is then reacted with component I,

| B) | further reaction of the stage A condensation product | |
| --- | --- | --- |
| | (A) at 150–250° C. with | |
| | 4–40 parts by weight of | an $\alpha,\beta$-unsaturated $C_3$- or $C_4$-mono- or dicarboxylic acid or with maleic anhydride (component IV) and |
| $C_1$) | reaction of the stage B adduct (B) at 100–200° C. with | |
| | 3–100 parts by weight of | a monounsaturated or polyunsaturated aliphatic mono-hydric or dihydric alcohol or amine or a monounsaturated or polyunsaturated $C_2$–$C_{12}$-aminoalcohol (component V) or |
| $C_2$) | reaction of (B) with | |
| | 2–30 parts by weight of | a $C_2$–$C_4$-alkylene oxide or of a $C_2$–$C_{12}$-alkanediol or $C_2$–$C_{12}$-aminoalcohol (component VI) at 100–200° C. and then with |
| | 10–100 parts by weight of | a monounsaturated or polyunsaturated $C_8$–$C_{40}$ fatty acid (component VII) at 150–250° C., | with the proviso that the molar amount of component (VII) is 0.2–1 mole per mole of (VI), or obtainable by

| D) | reaction of | |
| --- | --- | --- |
| | 100 parts by weight of | rosin (I) with |
| | 5–40 parts by weight of | component (IV) |
| | at 150–250° C., | |
| E) | reaction of the stage D adduct (D) at 100–200° C. with | |
| | 2–30 parts by weight of | a $C_2$–$C_{12}$-aminoalcohol (VIa), |
| F) | further reaction of the stage E product (E) at 50–250° C. with | |
| | 10–150 parts by weight of | component II and |
| | 3–50 parts by weight of | component III |
| | in the presence of a base or with | |
| | 10–200 parts by weight of | a component II/component III resol of an average degree of condensation of from 2 to 20 and |
| G) | reaction of the stage F condensation product (F) at 150–250° C. with | |
| | 10–100 parts by weight of | component VII in the molar ratios of (VII):(VI) mentioned under ($C_2$). |

2. A process for preparing a condensation product as claimed in claim 1, which comprises taking the measures mentioned in claim 1.

3. A print paste which is based upon a mineral oil and is curable by means of atmospheric oxygen, containing 2–20% by weight of a condensation product as claimed in claim 1 as a binder, as well as customary components.

* * * * *